United States Patent [19]

Chiappetti

[11] 4,239,975
[45] Dec. 16, 1980

[54] ENERGY PRODUCING SYSTEM

[76] Inventor: Arthur B. Chiappetti, 10600 S. Oakley, Chicago, Ill. 60643

[21] Appl. No.: 34,231

[22] Filed: Apr. 30, 1979

[51] Int. Cl.$^3$ .............................................. N02P 9/04
[52] U.S. Cl. .................................... 290/1 R; 310/15; 310/69; 310/75 R
[58] Field of Search ................. 290/1; 310/15, 69, 75

[56] References Cited

U.S. PATENT DOCUMENTS

| 3,185,873 | 5/1965 | Rosenfeld | 290/1 X |
| 3,699,367 | 10/1972 | Thomas | 310/69 |
| 3,885,163 | 5/1975 | Toberman | 290/1 |
| 3,944,855 | 3/1976 | Le Van | 310/69 |

*Primary Examiner*—Donovan F. Duggan

*Attorney, Agent, or Firm*—Bernard L. Kleinke

[57] ABSTRACT

In an energy producing system, a movable device is mounted at least partially within a housing which, in turn, is mounted in the ground at the surface of a road or the like. The movable device at least partially extends through an opening in the housing and is positioned transversely within the path of travel of vehicles moving along the road for engaging the vehicles seriatim to be set into motion thereby. A coupling device connects drivingly the movable device and a generating device for transmitting drivingly the motion of the movable device to the generating device, such as an electrical generator. A flywheel is journaled for rotation about its axis for storing the energy in response to the movable device to provide a more continuous production of energy from the generating device.

6 Claims, 4 Drawing Figures

ENERGY PRODUCING SYSTEM

BRIEF SUMMARY OF THE INVENTION

The present invention relates in general to an energy producing system, and it more particularly relates to an energy producing system for causing the generation of electrical energy in response to the movement of vehicles, such as automobiles, trucks and the like, moving along a roadway.

The conservation of energy has become a serious problem. Petroleum products are currently in short supply. The petroleum products are used widely and are currently used in the manufacture of gasoline for powering vehicles. Therefore, it would be highly desirable to conserve petroleum products used by vehicles to make better use of the energy consumed by vehicles. In this regard, it would be highly desirable to be able to convert the motion of vehicles along a roadway to useful energy, such as electrical energy. Such electrical energy could be used on tollways for lighting systems and other applications as well.

Therefore, the principal object of the present invention is to provide a new and improved energy producing system which can produce energy from moving vehicles.

Briefly, the above and further objects of the present invention are realized by providing in an energy producing system, a movable device mounted at least partially within a housing which, in turn, is mounted in the ground at the surface of a road or the like. The movable device at least partially extends through an opening in the housing and is positioned transversely within the path of travel of vehicles moving along the road for engaging the vehicles seriatim to be set into motion thereby. A coupling device connects drivingly the movable device and a generating device for transmitting drivingly the motion of the movable device to the generating device, such an as electrical generator. A flywheel is journaled for rotation about its axis for storing the energy in response to the movable device to provide a more continuous production of energy from the generating device.

BRIEF DESCRIPTION OF THE DRAWINGS

The above-mentioned and other objects and features of this invention and the manner of attaining them will become apparent, and the invention itself will be best understood by reference to the following description of embodiments of the invention taken in conjunction with the accompanying drawings, wherein.

DETAILED DESCRIPTION

Figure 1:
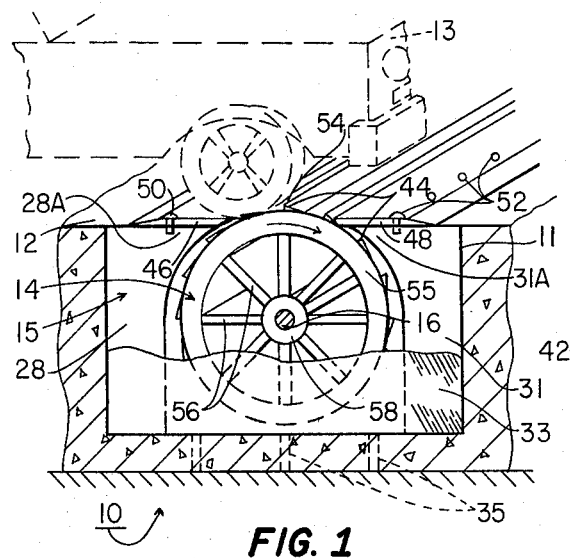
FIG. 1 is a fragmentary cross-sectional elevational view of an energy producing system, which is constructed in accordance with the present invention.
Figure 2:
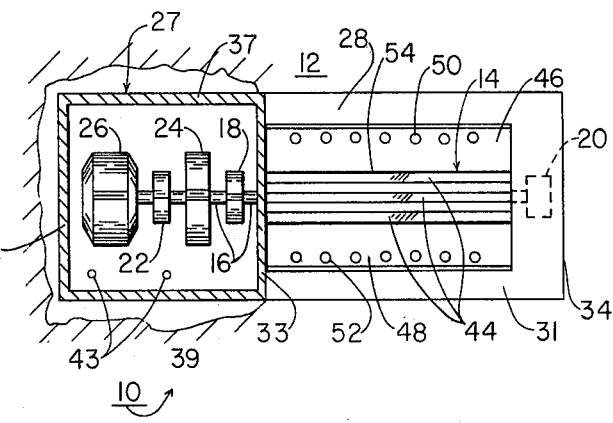
FIG. 2 is a fragmentary cross-sectional plan view of the system of FIG. 1.

Referring now to the drawings, and more particularly to FIGS. 1 and 2 thereof, there is shown an energy producing system 10, which is constructed in accordance with the present invention. The system 10 is mounted in an in-ground manner within an opening 11 in a roadway 12 over which a series of vehicles, such as the automobile 13, is driven therealong so that the system 10 engages the moving vehicles seriatim as they move along the roadway 12 for the production of energy as hereinafter described in greater detail. It will become apparent to those skilled in the art that the system 10 of the present invention may be installed in any roadway or the like where there exists heavy traffic patterns to best utilize the system of the present invention.

The system 10 generally comprises a movable member in the form of an axially rotatable drum 14 mounted for rotation about its axis within a housing 15 disposed within the opening 11, the axis of the drum 14 extending in a direction transverse to the flow of traffic along the roadway 12. A shaft 16 is spaced from and extends parallel to the plane of the surface of the roadway 12 and is journaled for rotation by means of a series of spaced-apart bearings 18, 20 and 22, the drum 14 being fixedly mounted for rotation thereon. The bearings 18 and 20 are mounted on opposite ends of the drum 14, and a flywheel 24 is fixed to the shaft 16 between the bearings 18 and the bearing 22 to store energy as the drum 14 rotates about its axis. As a result, as the vehicles drive continuously over the drum 14, their tires roll over the portion of the drum extending above the surface of the roadway 12 to cause it to rotate about its axis. The rotation of the drum 14 causes the shaft 16 to rotate about its axis, and the shaft 16, in turn, drives the flywheel 24 to rotate about its axis, the flywheel 24 maintaining the motion of the drum 14 during the intervals of time between vehicles driving thereover. An energy producing device in the form of the electrical generator 26 is connected drivingly to the shaft 16 and is positioned within a generator housing 27 disposed adjacent the drum housing 15.

Considering now the drum housing 15 in greater detail, the rigid metal drum housing 15 is disposed adjacent the generator housing 27 and has a pair of relatively thick vertical side walls 28 and 31 with a pair of vertical end walls 33 and 34 to define a generally rectangular interior space. The bottom of the housing 15 is open and the housing 15 rests on the roadway concrete slab at the bottom of the opening 11 to serve as a floor for the drum housing 15 as well as the generator housing 27. The upper portions 28A and 31A of the respective side walls 28 and 31 are thickened and the upper surfaces of which extend toward one another and are spaced apart to permit the upper portion of drum 14 to extend upwardly therethrough.

As shown in FIG. 1, a series of drain holes 35 extend through the concrete roadway 12 at the opening 11 to enable water and other moisture accumulation within the housing 15 to drain therefrom through the holes 35 to the subsoil therebelow. In this regard, rain water may enter the housing 15 and thus can drain therefrom through the openings 35 which extend to the subsoil therebelow.

The heat of the generator 26 is dissipated to the interior space of the generator housing 27 as well as the interior space of the drum housing 15 to prevent the accumulation of snow and ice therein during cold weather conditions. If additional heating is required, electrical heaters (not shown) may be installed within the drum housing 15 and the generator housing 27, such heaters being powered by the generator 26. During warm weather seasons and in warmer climates, the in-ground installation of the generator 26 tends to maintain cool temperature conditions within the interior space of the housing. If additional ventilation is required, electric fans (not shown) powered by the generator 26 may be employed to exhaust heated air through vent openings (not shown).

As shown in FIG. 2 of the drawings, the generator housing 27 has a pair of vertical side walls 37 and 39 which join a vertical end wall 42 and the common end wall 33 which separates the interior space of the generator housing 27 and the drum housing 15, the shaft 16 extending through an opening (not shown) in the common wall 33. The bottom of the housing 27 is open in a similar manner as the housing 15, and a series of drain holes 43 (FIG. 2) are provided in the roadway 12 for drainage purposes in a similar manner as the drain holes 35 are provided for the housing 15.

Considering now the drum 14 in greater detail, the drum 14 has a series of spaced-apart threads 44 extending axially along the outer surface of the drum 14 and projecting radially therefrom for engagement frictionally with the wheels of vehicles, such as the automobile 13, traveling along the roadway 12. The treads 44 are identical to one another and are triangularly shaped in cross section to present a wedge-shaped profile with the enlarged end facing toward an oncoming vehicle tires. A pair of parallel spaced-apart stiff flexible sealing strips 46 and 48 are fixed by means of fastening devices 50 and 52 in the form of bolts to the upper surfaces of the respective side walls 28 and 31 of the generator housing 27. The flexible sealing strips 46 and 48 extend parallel to one another and are spaced apart to define an opening 54 through which extends the upper portion of the drum 14 into the path of travel of the oncoming vehicles traveling along the roadway 12. The strips 46 and 48 help to reduce the amount of water entering the housing 15 and serve to scrape accumulations of snow and ice from the threads 44 before they are carried into the interior of the housing 15 during the cold weather seasons.

The drum 14 generally comprises an outer tubular shell 55 having a series of radially extending spoke plates 56 extending axially along the entire length of the shell 55 and rigidly interconnecting the outer shell with a centrally disposed axially extending hub 58. The hub 58 is mounted fixedly on the shaft 15 so that as the vehicles drive over the exposed portion of the shell 55 for causing the drum to rotate about its axis, the drum in turn rotates the shaft 16 about its axis.

In operation, as the vehicles, such as the automobile 13, drive along the roadway 12, the tires of the vehicles roll onto and over the upper portion of the drum 14 extending slightly above the surface of the roadway 12. The vehicle tires engage frictionally the threads 44 to cause the drum 14 to rotate about its axis. As a result, the drum 14 drives the shaft 16 to rotate about its axis to in turn drive the flywheel 24 and the generator 26.

Thus, the generator produces electricity which can be utilized in any desired manner. The flywheel 24 tends to enable the drum 14 to continue to rotate during the intervals of time between vehicles. The momentum of a series of moving vehicles tends to maintain the drum 14 in rotation and the system 10 causes very little or no loss in speed of the vehicles, so that the electricity is generated at very little or no expense of loss in fuel consumed by the vehicles.

Figure 3:
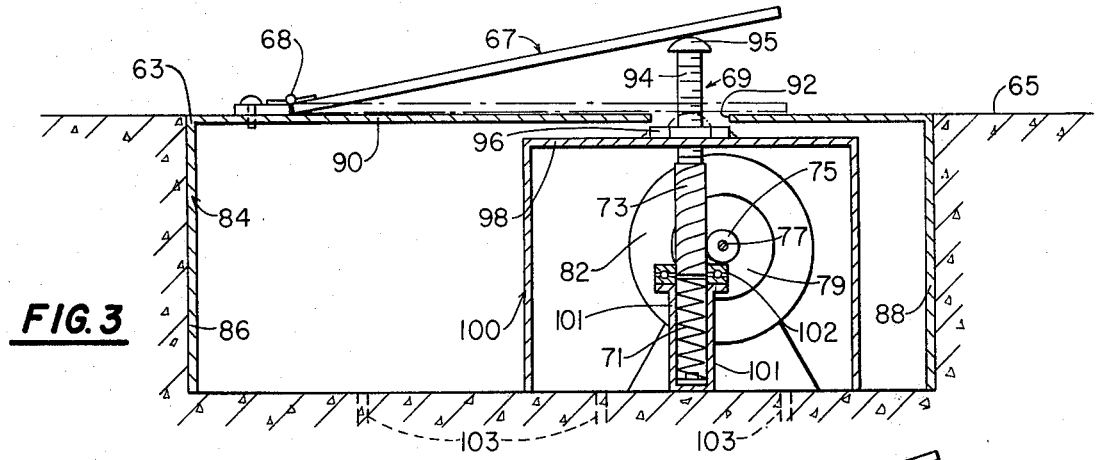
FIG. 3 is a cross-sectional fragmentary view of another energy producing system which is constructed in accordance with the present invention.

Referring now to FIG. 3 of the drawings, there is shown an energy producing system 61, which is constructed in accordance with the present invention and which is similar to the system 10 in that the in-ground system 61 is adapted to be mounted in an opening 62 in the roadway 65. The energy producing system 61 includes a movable device in the form of a platform 67 hingedly mounted at its lower edge at 68 to the surface of the roadway 65. The platform 67 is inclined upwardly therefrom and, at a position remote from its lowermost edge, rests upon a reciprocatively vertically mounted plunger 69 which extends vertically above the surface of the roadway 65. A biasing device in the form of a return spring 71 biases the plunger 69 to its position as indicated in FIG. 3 of the drawings to cause the platform 67 to be inclined upwardly in the direction of travel of the vehicles moving along the roadway 65. In this regard, as the vehicles travel along the roadway 65, their tires roll up onto the inclined platform 67 and the vehicle weight and momentum cause the plunger 69 to be pushed forcibly vertically downwardly against the force of the return spring 71 and thus to swing the platform 67 downwardly in a clockwise direction as viewed in FIG. 3 of the drawings and thus push the plunger 69 downwardly until the platform 67 assumes the horizontal position as indicated in phantom lines. After the vehicle passes over the platform 67, the return spring 71 forces the plunger 69 vertically upwardly to the position shown in FIG. 3 of the drawings to return the platform 67 to its initial inclined position.

A coupling device in the form of a vertically disposed worm 73 is rigidly and integrally fixed to and axially aligned with the plunger 69 to move in unison therewith and enages a traversely extending worm gear 75 which is fixedly mounted on a transversely extending shaft 77 which in turn is journaled for rotation about its opposite ends (not shown). A one-way clutch 79 connects drivingly the shaft 77 to the input of a generator 82 during the downward movement of the plunger 69. As the plunger 69 moves vertically downwardly, the worm 73 drives the worm gear 75, which in turn drives its shaft 77 for driving in turn the generator 82 via the one-way clutch 79. When the return spring 71 snaps the worm 73 and the plunger 69 upwardly to return the platform 67 abruptly to its initial inclined position, the one-way clutch 79 frees the shaft 77 from the generator 82.

A generally rectangular housing 84 is disposed within the opening 63 resting on the concrete slab portion of the roadway 65 and has an open bottom with a pair of side walls 86 and 88 with a top wall 90 in a similar manner as the housing 15 of FIG. 1. An opening 92 in the top wall 90 enables the upper portion of the plunger 69 to extend therethrough in its initial position as indicated in FIG. 3 of the drawings.

The plunger 69 includes a threaded rod 94 having a rounded head portion 95 extending above the surface of the roadway 65 in its initial position to enage the underside of the platform 67. A nut 96 is fixed to a top wall 98 of a support structure 100 disposed within the interior of the housing 84 and threadably engages and surrounds the threaded rod 94 so that as the rod 94 is pushed downwardly by the platform 67, the threaded rod 94 rotates about its axis to in turn rotate the worm 73 about its axis.

A vertically disposed tubular housing 101 is mounted on the concrete slab within the housing 84 and is disposed in axial alignment with the worm 73. A thrust bearing 102 is mounted on the top end of the tubular housing 101 to surround the worm 63 as it moves reciprocatively upwardly and downwardly into and out of the tubular housing 101.

A series of drain holes 103 in the bottom concrete slab portion of the bottom wall of the housing 84 enables rain water and other moisture accummulation to drain out of the interior of the housing 84 in a similar manner as the drain holes 35 of FIG. 1. The heat generated by the generator 82 enables snow and ice entering the interior of the housing 84 to be melted and thus drain from the interior of the housing 84 via the drain holes 103.

Figure 4:
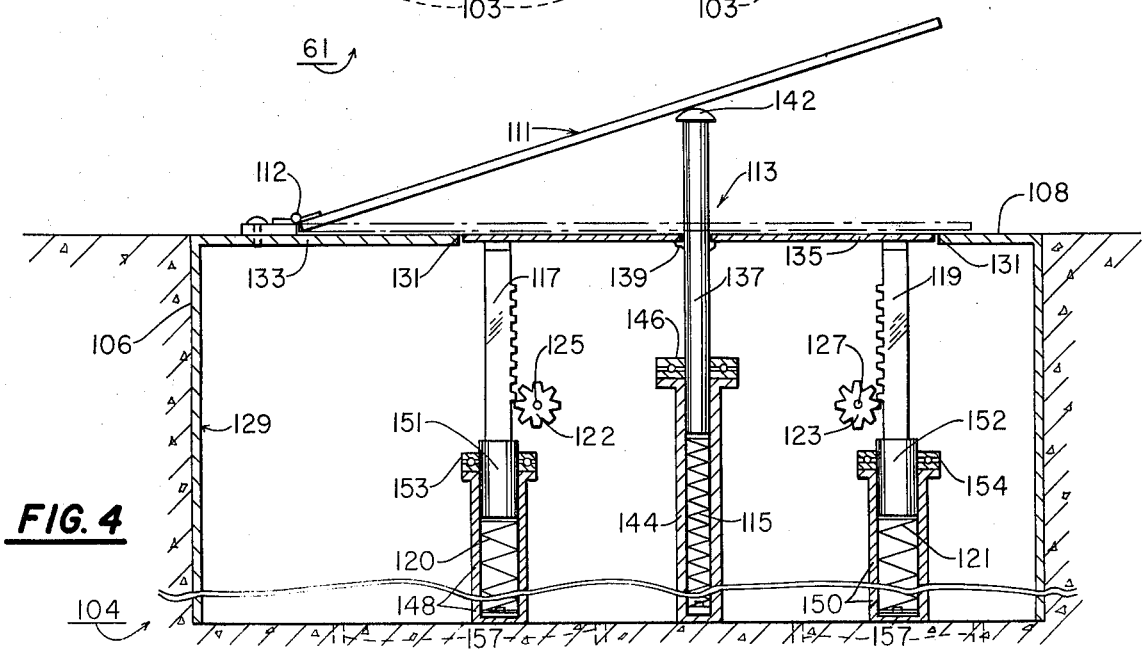
FIG. 4 is a cross-sectional elevational view of yet another energy producing system, which is also constructed in accordance with the present invention.

Referring now to FIG. 4 of the drawings, there is shown an energy producing system 104, which is constructed in accordance with the present invention, and which is similar to the system 61 in that the system 104 is mounted in an opening 106 of a roadway 108 for producing electrical energy by the forces exerted on the system 106 by vehicles (not shown) moving along the roadway 108.

The system 104 generally comprises an inclined platform 111 which is hingedly mounted at one edge at 112 at the surface of the roadway 108 in a manner similar to the platform 67 of FIG. 3 and at a position spaced therefrom rests on top of a vertically-disposed reciprocatively mounted plunger 113 to maintain yieldably the platform 111 in an inclined manner, in a similar manner as the plunger 69 supports the platform 67. As vehicles ride up onto the platform 111, the vehicle weight and momentum cause the platform 111 to swing about its hinged connection at 112 in a clockwise direction downwardly and thus to force the plunger 113 vertically downwardly against the force of a biasing device in the form of a return spring 115. As a result, the platform 111 swings downwardly into a horizontal position as indicated in the phantom lines of FIG. 4. After the vehicle has traveled past the platform 111, the return spring 115 snaps the plunger 113 vertically upwardly to raise abruptly the platform 111 to its initial inclined position as shown in solid lines in FIG. 4 of the drawings, to prepare it for the next vehicle tires moving into engagement with the platform 111.

A pair of vertically extending, reciprocatively mounted racks 117 and 119 are disposed on opposite sides of and move with the reciprocatively mounted plunger 113 whereby the racks move upwardly and downwardly against the force of their respective return spring 120 and 121. Therefore, as the platform 111 and plunger 113 move downwardly, the racks 117 and 119 move vertically downwardly as hereinafter described in greater detail. A pair of pinions 122 and 123 mounted transversely of and in engagement with the respective racks 117 and 119 are driven rotatably about their axes to in turn drive their shafts 125 and 127, which in turn drive a pair of generators (not shown) to generate electricity to be utilized as desired.

Considering now the system 104 in greater detail with reference to the drawings, an opened-bottom housing 129 is mounted within the opening 106 and is similar to the housing 15 of FIG. 1. An opening 131 in the top wall 133 of the housing 129 permits the upper end of the plunger 113 to extend therethrough in an upward direction to maintain the platform 111 in its inclined position as shown in solid lines in FIG. 4 of the drawings. A horizontal plate 135 is normally disposed in a position within the opening 131 as shown in FIG. 4 of the drawings, and is fixed to a rod 137 of the plunger 113 by means of an annular weld 139. As a result, when the plunger 113 moves upwardly and downwardly reciprocatively, the horizontal plate 135 moves therewith and is carried thereby. The racks 117 and 119 are fixed a their upper ends to the plate 135 by any suitable technique, such as by welding and then grinding down the welds. The rod 137 of the plunger 113 has a rounded head 142 at its upper end for engagement with the underside of the platform 111. A tubular housing 144 is mounted on the concrete slab at the bottom of the opening 53 within the housing 106 to urge resiliently the rod 137 to its initial position as shown in solid lines in FIG. 4 of the drawings. A thrust bearing 146 surrounds the rod 137 at the upper end of the tubular housing 144.

Similarly, a pair of tubular housings 148 and 150 receive the rodlike bottom end portions 151 and 152 of the respective racks 117 and 119 which move reciprocatively upwardly and downwardly within the tubular housings 148 and 150 respectively. A pair of thrust bearings 153 and 154 surround the rodlike portions 151 and 152, respectively, at the open upper ends of the respective tubular housing 148 and 150.

A series of spaced-apart drain holes 157 extend through the concrete slab to the subsoil below in the same manner and for the same purpose as the drain holes 35 of the system 10.

While particular embodiments of the present invention have been disclosed, it is to be understood that various different modifications are possible and are contemplated within the true spirit and scope of the appended claims. For example, in the system 61 and the system 104, various different coupling means are provided for connecting drivingly the movable device, (e.g., the reciprocatively movable plunger) and the generator. It should be understood that if desired, a plurality of plungers may be provided for supporting the inclined platforms, and a plurality of racks may be employed with the system 104. Also, for example, in place of the spring loaded plunger, shown in the system 104, air suspension cylinders may be provided to provide the vertical reciprocative movement. There is no intention, therefore, of limitations to the exact abstract or disclosure herein presented.

The embodiments of the invention in which an exclusive property or privilege is claimed are defined as follows:

1. In an energy producing system having energy generating means and apparatus for driving said energy generating means, said apparatus comprising: housing means mounted in the ground at the surface of a road or the like, said housing having a top wall being disposed substantially flush with the upper surface of the road, said top wall having means defining an opening therein; movable means being mounted at least partially within said housing and at least partially extending through said opening in the path of travel of wheels supporting the vehicles moving along the road for engaging the tires of the vehicles seriatim; and coupling means connected drivingly between said movable means and said generating means for transmitting the motion of said movable means to said generating means; said coupling means including a flywheel journaled for rotation about its axis for storing energy in response to said movable means; said movable means including a drum rotatably mounted about its axis and having a portion thereof extending at least partially within said housing means and at least partially extending through the opening transversely to the path of travel of vehicles moving along the road; said drum having a diameter substantially greater than the diameter of at least some of the tires of the vehicles rolling thereover; said drum including a plurality of elongated resilient strips extending axially along the outer periphery thereof for engagement with the tires of vehicles moving along the road, said strips being triangular in cross section and having a radially extending face and a sloping face.

2. In an energy production system, said apparatus according to claim 1, wherein, said drum having a rotatably mounted hub and a series of radially extending plates.

3. In an energy producing system, said apparatus according to claim 1, further including a rigid housing mounted within an opening in the roadway and having an open bottom end, means defining drain holes in the concrete forming the roadway below said housing for draining water from the interior of the housing.

4. In an energy production system, said apparatus according to claim 1, further including a pair of parallel spaced-apart flexible sealing members defining an elongated opening for receiving therethrough the upper portion of said drum for reducing the amount of water entering said housing and for serving to scrape accumulations of snow and ice from said strips.

5. In an energy production system, said apparatus according to claim 4, wherein said drum having a rotatably mounted hub and a series of radially extending plates.

6. In an energy production system, said apparatus according to claim 5, further including a rigid housing mounted within an opening in the road and having an open bottom end, means defining drain holes in the concrete forming the road below said housing for draining water from the interior of the housing.

* * * * *